United States Patent Office 3,542,520

Patented Nov. 24, 1970

3,542,520

MODIFIED "DEACON" PROCESS

Walter L. Borkowski, Media, Pa., assignor to Sun Oil Company, Philadelphia, Pa., a corporation of New Jersey No Drawing. Filed Dec. 27, 1967, Ser. No. 693,755
Int. Cl. C01b 7/04
U.S. Cl. 23—219 2 Claims

ABSTRACT OF THE DISCLOSURE

A method of increasing the rate of reaction in the production of chorine by the "Deacon" process wherein a volume of water not greater than the volume of oxygen to be reacted is introduced into the reaction along with the oxygen.

This invention relates to the production of chlorine, and more particularly, to the production of chlorine from the oxidation of hydrogen chloride.

For many years, chlorine has been produced from a reaction involving the oxidation of hydrogen chloride in the presence of a catalyst. The reaction is known as the "Deacon" reaction or process and may be represented by the following equation:

$$4HCl+O_2 \rightleftarrows 2Cl_2+2H_2O$$

To carry out this reaction, hydrogen chloride is mixed with pure oxygen, air, or other oxygen-containing gases and is passed over a catalyst at an elevated temperature. The gases emitted are chlorine and steam, together with unreacted hydrogen chloride and oxygen, and nitrogen if air is employed.

Heretofore, many attempts have been made to improve the efficiency of the process for commercial applicability. In this regard, several U.S. patents have issued which suggest various methods for improving the process. Specifically, U.S. Pat. No. 2,299,474 suggests a method whereby the gaseous reaction products are scrubbed with a cold concentrated aqueous hydrochloric acid solution, thereby producing a liquid fraction comprising a water-hydrogen chloride maximum boiling azeotrope and an overhead gaseous fraction comprising a substantially anhydrous mixture of hydrogen chloride and chlorine. A portion of the anhydrous gaseous mixture is resubjected to the catalytic reaction, while chlorine is separated from the remaining gaseous mixture. The patentee suggests the removal of water from the effluent gases as an aid in the chlorine formation.

U.S. Pat. No. 2,746,844 discloses a method of controlling the high exothermic heat liberated during the reaction by bringing the reaction products in admixture with a substantial portion of the catalyst into direct contact with cool liquid aqueous hydrogen chloride, thus forming a catalyst-containing liquid phase of aqueous hydrogen chloride and catalyst and a catalyst-free gaseous phase. The catalyst-containing liquid phase is then returned to the reaction zone. The patent further discloses that the direct introduction of cooling media, such as water, into the reaction zone has proven unsatisfactory and has shown a deleterious effect.

More recently, in U.S. Pat. No. 3,159,455 the patentee suggests a method of increasing the conversion of reactants by contacting the reactant vapors with a desiccant and a "Deacon" catalyst which are fluidized in the reaction zone. Since the desiccant in the reaction zones does not accomplish complete removal of the water, the effluents are then contacted with a desiccant in the cooling zone. Again, it is the removal of water which tends to improve the process.

Although all of the above disclosures tend to show some improvement over the basic "Deacon" reaction, the process still has not been fully successful commercially. Although all of the processes tend to increase the degree of conversion, they have failed to improve the rate of the reaction, that is, the rate at which chlorine is obtained.

It is, therefore, the object of this invention to provide a process for the production of chlorine which is commercially feasible.

Specifically, it is the object of this invention to provide a process which gives a substantial degree of conversion of hydrogen chloride while at the same time improving the rate of reaction.

These and other objects and advantages of the invention will become apparent as the invention is more fully disclosed.

In accordance with the objects of the invention, I have found that an improved process is obtained by adding a limited amount of water to the reactants. Specifically, the invention contemplates the introduction of a volume of water vapor less than the volume of oxygen to be reacted, and preferably equal to 10–60% by volume of the oxygen. The oxygen can be present either as pure oxygen, air or other oxygen-containing gases. Carrying out the reaction in this manner enables one to obtain approximately 60% conversion to chlorine in a relatively short period of time. It should be noted that in the instant process, unlike the prior art, is not dependent upon the attainment of an equilibrium condition, but rather is primarily directed to obtaining an improved rate of reaction without substantially sacrificing the degree of conversion.

In carrying out this process, it is beneficial but not essential to remove water from the system as it is formed, in order to carry the reaction further to completion. The water can be removed as formed from the products as is well known in the prior art, such as by allowing the vaporous products to flow over a desiccant as is described in U.S. Pat. No. 3,159,455, and other patents previously cited. Alternatively, it is possible to remove the chlorine from the reaction. In this secondary process, the hot vaporous reaction products of the Deacon reaction are allowed to pass over a bed of $FeCl_2$ which will react with the chlorine and form $FeCl_3$.

Any of the catalysts well known in the art can be employed in carrying out the objects of this invention. Among the catalysts previously used are the oxides of magnesium, chromium, titanium silica and aluminum, and the chlorides of magnesium, chromium, copper, iron, nickel, cobalt mounted on various substrates, as well as rare earth additives and catalyst volatility reducers. The amount of catalyst used will vary depending on the catalyst itself, amount of reactants and reaction conditions. Particularly good results have been obtained when employing an alumina-supported chromic oxide catalyst.

Operating conditions will vary somewhat depending upon the catalyst employed, although generally, temperatures in the range of 300°–450° C. are employed successfully.

In carrying out the process of the invention, the water water vapor may enter into the reaction zone with the oxygen. That is, the oxygen is passed through water, picking up the desired amount, before entering into the reaction zone. Alternatively, the catalyst can be subjected to water vapor so that it holds the water at the operating conditions. If the water is added directly into the reactor, its effect will be negligible, and in some instances will tend to destroy the catalytic activity.

EXAMPLE I

As a specific example of my invention, 20 grams of Houdry Chrome Alumina Dehydrogenation Catalyst Type A, a trademark product of Houdry Chemical Company, comprising an alumina-supported chromic oxide catalyst was disposed in a chamber. Subsequently, wet oxygen obtained by the passage of oxygen as fine bubbles via a sintered disc submerged in water was introduced along with hydrogen chloride into the reactor chamber. The proportions used were defined in terms of the rates of gas flow which were 600 ml./hr. of oxygen, 120 ml./hr. water vapor and 2400 ml./hr. of hydrogen chloride gas. The temperature was maintained at 425° C. The vaporous reaction products taken from the reactor consisted mainly of free chlorine, water vapor and unreacted hydrogen chloride. The products were analyzed, and the analysis showed that approximately 62.5% of the hydrogen chloride had been converted to chlorine.

EXAMPLE II

The same procedure and reaction conditions as set forth in Example I were employed, except that no water was introduced into the reactor with the oxygen. Consequently, the reaction times were essentially equivalent, but only about 46.8% of the hydrogen chloride had been converted. Similar reactions were carried out at various temperatures. The results are shown in Table 1.

TABLE 1

| Temp. ° C. | Percent HCl conversion, no water added | Water added |
|---|---|---|
| 325 | 15.1 | 21.8 |
| 350 | 24.0 | 32.5 |
| 400 | 38.0 | 50.5 |
| 425 | 46.8 | 62.5 |

It should be noted that the data in Table 1 is based on a constant time for each reaction. If the reaction without water added would be allowed to go to completion, its percent conversion would surpass the conversion of the instant process. However, the time necessary for it to reach completion is sufficiently long that the process would be economically unfeasible. These difficulties are overcome with my new process which combines substantial conversion with an improved rate of reaction.

While the particular compositions and methods of application described herein are well adapted to meet the objects of the present invention, various modifications or changes may be resorted to without departing from the scope of the invention as defined in the claims.

What is claimed is:

1. An improved process for producing chlorine by the catalytic oxidation of hydrogen chloride whereby the rate of chlorine production is significantly increased, which comprises passing hydrogen chloride and an oxygen-containing gas together with an amount of water vapor equal to 10% to 60% of the volume of oxygen over a catalyst comprised of chromic oxide supported on alumina maintained at a temperature in the range of 300° to 450° C.

2. The process of claim 1 wherein the temperature is about 425° C.

References Cited

UNITED STATES PATENTS 2,436,870 3/1948 Murphree ---------- 23—219
2,448,255 8/1948 Benedictis et al. ----- 23—219 X
2,987,378 6/1961 Thoma ------------- 23—219
3,006,732 10/1961 Baumgartner et al. ---- 23—219
3,073,092 1/1963 Ancrum et al. ------- 55—71 X

FOREIGN PATENTS 1,088,934 9/1960 Germany.

OSCAR R. VERTIZ, Primary Examiner

G. O. PETERS, Assistant Examiner